United States Patent
Yokoyama et al.

(10) Patent No.: US 11,251,434 B2
(45) Date of Patent: Feb. 15, 2022

(54) ORGANIC EXPANDER FOR LEAD STORAGE BATTERY

(71) Applicant: NIPPON PAPER INDUSTRIES CO., LTD., Tokyo (JP)

(72) Inventors: Shigeki Yokoyama, Tokyo (JP); Hikaru Aimi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 17/253,656

(22) PCT Filed: Jul. 8, 2019

(86) PCT No.: PCT/JP2019/026948
§ 371 (c)(1),
(2) Date: Dec. 18, 2020

(87) PCT Pub. No.: WO2020/013112
PCT Pub. Date: Jan. 16, 2020

(65) Prior Publication Data
US 2021/0265635 A1    Aug. 26, 2021

(30) Foreign Application Priority Data
Jul. 9, 2018 (JP) ............................. JP2018-129745

(51) Int. Cl.
| H01M 4/00 | (2006.01) |
| H01M 4/62 | (2006.01) |
| H01M 4/14 | (2006.01) |
| H01M 4/02 | (2006.01) |

(52) U.S. Cl.
CPC .............. *H01M 4/627* (2013.01); *H01M 4/14* (2013.01); *H01M 2004/027* (2013.01)

(58) Field of Classification Search
CPC ......... Y02E 60/10; H01M 4/627; H01M 4/14; H01M 4/62
See application file for complete search history.

(56) References Cited

U.S. PATENT DOCUMENTS

| 2,371,136 A | 3/1945 | Harmon |
| 2,680,113 A | 6/1954 | Adler et al. |
| 3,523,041 A | 8/1970 | Limbert et al. |
| 5,049,661 A | 9/1991 | Dilling |
| 6,346,347 B1 | 2/2002 | McNally et al. |
| 6,585,880 B1 | 7/2003 | Watanabe et al. |
| 6,664,002 B2 | 12/2003 | McNally et al. |
| 2004/0053130 A1 | 3/2004 | Umetani et al. |
| 2008/0047674 A1 | 2/2008 | Ohman et al. |
| 2008/0051566 A1 | 2/2008 | Ohman et al. |
| 2013/0131326 A1 | 5/2013 | Hannus et al. |
| 2016/0380261 A1* | 12/2016 | Atanassova ............. H01M 4/57 429/213 |

FOREIGN PATENT DOCUMENTS

| JP | S58-45287 A | 3/1983 |
| JP | S62-145655 A | 6/1987 |
| JP | H09-007630 A | 1/1997 |
| JP | H11-204111 A | 7/1999 |
| JP | 2000-336589 A | 12/2000 |
| JP | 2002-117856 A | 4/2002 |
| JP | 2005-294027 A | 10/2005 |
| JP | 2006-169134 A | 6/2006 |
| JP | 2007-165273 A | 6/2007 |
| JP | 2015-88379 A | 5/2015 |
| JP | 2016-135834 A | 7/2016 |
| WO | 02/039519 A1 | 5/2002 |
| WO | 2006/031175 A1 | 3/2006 |
| WO | 2006/038863 A1 | 4/2006 |
| WO | 2012/005677 A1 | 1/2012 |

OTHER PUBLICATIONS

Wikipedia, free encyclopedia for Lignosulfonates or sulfonated lignin. Oct. 9, 2021.*
Oita et al.; "Studies on Utilization of Lignin. III. Sulfomethylation of Thiolignin," Journal of Wood Science; pp. 239-244; 1966; vol. 12, No. 5.
Chen; "Methods in Lignin Chemistry;" Published by Uni Publishing Co., Ltd., 1994; pp. 336-341.
Oct. 1, 2019 Search Report issued in International Patent Application No. PCT/JP2019/026948.
Jan. 12, 2021 International Preliminary Report on Patentability issued in International Patent Application No. PCT/JP2019/026948.

* cited by examiner

Primary Examiner — Cynthia H Kelly
Assistant Examiner — Monique M Wills
(74) Attorney, Agent, or Firm — Oliff PLC

(57) ABSTRACT

An organic expander for a lead storage battery, the organic expander containing lignin in which the methoxy group content relative to the solid content is 3 to 20 mass %, wherein the organic expander contains an organic acid in an amount of 0.0001 to 5 mass % relative to the solid content of the organic expander. It is possible to improve charge acceptance while maintaining the discharge characteristics of the lead storage battery.

3 Claims, No Drawings

ORGANIC EXPANDER FOR LEAD STORAGE BATTERY

TECHNICAL FIELD

The present invention relates to an organic expander for a lead storage battery.

BACKGROUND ART

A lead storage battery is relatively inexpensive and has stable performance as a secondary battery, and therefore, has been widely used as a battery for an automobile, a battery for a portable device, a backup battery for a computer, a battery for communication, or the like.

When the lead storage battery changes from a discharged state to a charged state during the repeated charging and discharging, the negative electrode active material shrinks and the specific surface area decreases, and the discharge performance deteriorates. Further, in the negative electrode active material, metallic lead emits electrons and changes to lead sulfate in the discharge reaction, and the lead sulfate obtains the electrons and changes to the metallic lead in the charge reaction. If the lead sulfate becomes coarsened, the lead sulfate is hardly dissolved in the charge reaction, and the charging performance deteriorates.

It has been proposed to add lignin extracted from wood as an organic expander to be added to a negative electrode active material in order to prevent the shrinkage of the negative electrode active material of a lead storage battery (Patent Literatures 1 to 3).

In addition, as the lignin for a lead storage battery, some kinds of lignins have been disclosed (Patent Literatures 4 to 11).

CITATION LIST

Patent Literature

Patent Literature 1: U.S. Pat. No. 2,371,136
Patent Literature 2: U.S. Pat. No. 3,523,041
Patent Literature 3: JP 62-145655 A
Patent Literature 4: JP 2002-117856 A
Patent Literature 5: WO 2002/039519
Patent Literature 6: JP 2005-294027 A
Patent Literature 7: JP 2007-165273 A
Patent Literature 8: JP H11-204111 A
Patent Literature 9: JP H09-007630 A
Patent Literature 10: U.S. Pat. No. 6,346,347
Patent Literature 11: U.S. Pat. No. 6,664,002

SUMMARY OF INVENTION

Technical Problem

Various performances are required in a lead storage battery, but in general, in a case where lignin is added to a negative electrode of the lead storage battery, although an effect of improving low-temperature rapid discharge performance, suppressing sulfation is obtained, and the like, there is a problem that the charge acceptance is lowered by the nature.

An object of the present invention is to provide an organic expander that can improve charge acceptance while maintaining the discharge characteristics of the lead storage battery described above.

Solution to Problem

[1] An organic expander for a lead storage battery containing lignin having a methoxy group content of 3 to 20% by mass per solid content, the organic expander including an organic acid in an amount of 0.0001 to 5% by mass per solid content of the organic expander.
[2] The organic expander for a lead storage battery described in [1], in which the organic acid is at least one organic acid (salt) selected from xylonic acid (salt), galactonic acid (salt), arabinonic acid (salt), meta-saccharinic acid (salt), iso-saccharinic acid (salt), and glycolic acid (salt).
[3] The organic expander for a lead storage battery described in [1] or [2], in which in the lignin, an S content of a sulfonic acid group (S content of a group represented by the general formula (1): —$SO_3M$ (M represents a hydrogen atom, a monovalent metal salt, or a divalent metal salt in the general formula (1)) is 1.0 to 4.0% by mass per solid content.
[4] A lead storage battery, including an electrode plate, in which the organic expander described in any one of [1] to [3] is added to the electrode plate.

Advantageous Effects of Invention

According to the present invention, it is possible to improve the charge acceptance while maintaining the discharge characteristics of a lead storage battery.

DESCRIPTION OF EMBODIMENTS

Hereinafter, the present invention will be described in detail according to the suitable embodiments. However, the present invention should not be limited at all to the following embodiments. Further, the expression "to" includes both end values in the present invention. That is, the expression "X to Y" includes values of the X and Y at both ends.

<Organic Expander>

The organic expander according to the present invention contains lignin having a methoxy group content of 3 to 20% by mass per solid content. It is preferable that the organic expander contains lignin in which the methoxy group content is 5 to 19.5% by mass, and is more preferable that the agent contains lignin in which the methoxy group content is 7 to 19.2% by mass. In a case where the methoxy group content is less than 3%, the effect as the organic expander cannot be recognized because the amount of the lignin to be contained is small. In general, lignin has a methoxy group attached to an aromatic nucleus, and therefore, the methoxy group content is an index of the lignin content.

In the present invention, the methoxy group content is a value as measured by a quantitative method of methoxy groups with the Viebock and Schwappach procedure (see, pp. 336 to 341 of "Methods in lignin chemistry" published by Uni Publishing Co., Ltd. in 1994).

As the lignin used for the organic expander according to the present invention, it is preferable to use a lignin derived from woody biomass, but the lignins to be obtained differ depending on the method for treating the woody biomass, and there are several kinds of lignins.

Examples of the lignin to be used in the present invention include the following lignins. For example, there are lignosulfonates, kraft lignin, soda lignin, soda-anthraquinone lignin, organosolv lignin, steam-exploded lignin, sulfuric acid lignin (Klason lignin), and the like. Among them, it is preferable to use lignosulfonates, or kraft lignin. In particular, preferably, as disclosed in U.S. Pat. No. 6,346,347, it is particularly to use oxylignin that has been partially desulfonated by reacting lignosulfonates at high temperature and high pressure under an alkaline condition.

The lignin to be used in the present invention may be in a powdered state or a liquid state, but the lignin in a powdered state is preferable. As the lignin in a liquid state, for example, lignin in a powdered state may be dissolved in an appropriate solvent (for example, water, aqueous sodium hydroxide solution, or the like) to obtain lignin in a liquid state.

As the lignin to be used in the present invention, the lignins described above may be used singly or in mixture of two or more kinds thereof in combination.

The lignosulfonates and kraft lignin, which can be used in the present invention, will be described in detail below, but the lignin to be used in the present invention is not limited to those lignins.

(Lignosulfonates)

Lignosulfonates refer to a compound in which at least part of the lignin or a degradation product of the lignin is replaced with a sulfonic acid (salt) group. In a case where the lignosulfonates are contained in the organic expander according to the present invention, the lignosulfonates have an S content of a sulfonic acid (salt) group of preferably 1.0 to 4.0% by mass.

The S content of a sulfonic acid (salt) group of lignosulfonates means the S content contained in the sulfonic acid (salt) group relative to the solid content of lignosulfonates. Specifically, the S content is a value calculated by the following mathematical formula (1).

$$S \text{ content (\% by mass) of sulfonic acid (salt) group} = \text{the total } S \text{ content (\% by mass)} - \text{inorganic } S \text{ content (\% by mass)} \quad \text{Mathematical formula (1):}$$

(in the mathematical formula (1), the S content indicates the S content relative to the solid content of lignosulfonates in any case.)

In the mathematical formula (1), the total S content can be quantified by ICP emission spectroscopy. Further, the inorganic S content can be calculated as the total amount of the $SO_3$ content and $SO_4$ content quantified by ion chromatography.

The lignosulfonates of the present invention contain reducing sugars. The reducing sugars generally remain in the sulfite cooking process of woody biomass. The reducing sugars are usually contained in an amount of 0.01 to 20.0% by mass.

The reducing sugar means a sugar that exhibits reducibility, and also means a sugar that generates an aldehyde group or a ketone group in a basic solution.

Examples of the reducing sugar include all of monosaccharides, a disaccharide such as maltose, lactose, arabinose, or invert sugar of sucrose, and a polysaccharide. In general, examples of the reducing sugar contained in an alkali-treated waste liquid include cellulose, hemicellulose, and degradation products thereof. Examples of the degradation products of cellulose and hemicellulose include a monosaccharide such as rhamnose, galactose, arabinose, xylose, glucose, mannose, or fructose; and an oligosaccharide such as xylo-oligosaccharide, or cello-oligosaccharide.

In measurement of the reducing sugar, the content of the reducing sugar can be determined by measuring the reducing sugar by the Somogyi-Schaffer method, and by converting the measured value into the amount of glucose.

The lignosulfonates may be in a state of not being ionized, or the hydrogen atom of the sulfonic acid group may be replaced with a counter ion.

Examples of the counter ion include a sodium ion, a calcium ion, a magnesium ion, and an ammonium ion.

In this regard, the counter ions may be used singly alone, or in combination of two or more kinds thereof.

In general, an inorganic salt is contained in the lignosulfonates. Examples of the inorganic salt include sodium sulfate, sodium sulfite, sodium chloride, magnesium sulfate, magnesium sulfite, magnesium chloride, calcium sulfate, calcium sulfite, calcium chloride, ammonium sulfate, ammonium sulfite, ammonium chloride, and sodium hydroxide. The content of the inorganic salt in the lignosulfonates is usually 1 to 25% by mass.

(Preparation Method of Lignosulfonates)

The lignosulfonates can be prepared, for example, as described in the below. The lignosulfonates can be prepared by subjecting a lignocellulose raw material to sulfite treatment. In particular, it is preferable to prepare the lignosulfonates by subjecting a lignocellulose raw material to sulfite cooking treatment.

The lignocellulose raw material is not particularly limited as long as it contains lignocellulose in the formation. Examples of the lignocellulose raw material include raw materials for pulp, such as wood, and non-wood.

Examples of the wood include a coniferous tree wood such as Japanese spruce (*Picea jezoensis*), Japanese red pine (*Pinus densiflora*), Japanese cedar (*Cryptomeria japonica*), or Japanese cypress (*Chamaecyparis obtusa*), and a broad-leaved tree wood such as Japanese white birch (*Betula platyphylla*), or Japanese beech (*Fagus crenata*). There are no restrictions on the age and collection site of the wood. Accordingly, woods collected from trees with the ages different from each other, or woods collected from parts of the trees different from each other may be used in combination.

Examples of the non-wood include bamboo, kenaf, reed, and a rice plant.

As the lignocellulose raw material, these materials may be used singly alone or in combination of two or more kinds thereof.

The sulfite treatment is a treatment in which at least either sulfurous acid or a sulfite can be brought into contact with a lignocellulose raw material to obtain an intermediate product. The conditions for sulfite treatment are not particularly limited, and as the conditions, conditions under which a sulfonic acid (salt) group can be introduced into an α-carbon atom on the side chain of the lignin contained in the lignocellulose raw material may be accepted.

It is preferable that the sulfite treatment is performed by a sulfite cooking method. In this way, lignin in the lignocellulose raw material can be sulfonated more quantitatively.

The sulfite cooking method is a method in which a lignocellulose raw material is reacted at a high temperature in a solution (for example, an aqueous solution: cooking liquor) of at least either sulfurous acid or a sulfite. The method has been industrially established and practiced, as a method for producing sulfite pulp. Therefore, by performing the sulfite treatment by a sulfite cooking method, the economic efficiency and the ease of implementation can be improved.

In a case where sulfite cooking is performed, examples of the salt of sulfite include a magnesium salt, a calcium salt, a sodium salt, and an ammonium salt.

The concentration of sulfurous acid ($SO_2$) in a solution of at least either sulfurous acid or a sulfite is not particularly limited, but the ratio of mass (g) of $SO_2$ to 100 mL of reaction chemical solution is preferably 1 g/100 mL or more, and more preferably 2 g/100 mL or more in a case where sulfite cooking is performed. The upper limit is preferably 20 g/100 mL or less, and more preferably 15 g/100 mL or less in a case where sulfite cooking is performed. The $SO_2$ concentration is preferably 1 to 20 g/100 mL, and more preferably 2 to 15 g/100 mL in a case where sulfite cooking is performed.

The pH value in the sulfite treatment is not particularly limited, but is preferably 10 or less, and more preferably 5 or less in a case where sulfite cooking is performed. The lower limit of the pH value is preferably 0.1 or more, and more preferably 0.5 or more in a case where sulfite cooking is performed. The pH value at the time of performing the sulfite treatment is preferably 0.1 to 10, and more preferably 0.5 to 5 in a case where sulfite cooking is performed.

The temperature in the sulfite treatment is not particularly limited, but is preferably 170° C. or less, and more preferably 150° C. or less in a case where sulfite cooking is performed. The lower limit is preferably 70° C. or more, and more preferably 100° C. or more in a case where sulfite cooking is performed. The temperature condition in the sulfite treatment is preferably 70 to 170° C., and more preferably 100 to 150° C. in a case where sulfite cooking is performed.

The treatment time of the sulfite treatment is not particularly limited, and is preferably 0.5 to 24 hours and more preferably 1.0 to 12 hours, although depending on the various conditions of the sulfite treatment.

In the sulfite treatment, it is preferable to add a compound that supplies a counter cation (salt). By adding a compound that supplies a counter cation, the pH value in the sulfite treatment can be kept constant. Examples of the compound supplying a counter cation include MgO, $Mg(OH)_2$, CaO, $Ca(OH)_2$, $CaCO_3$, $NH_3$, $NH_4OH$, NaOH, $NaHCO_3$, and $Na_2CO_3$. The counter cation is preferably a magnesium ion.

In the sulfite treatment, in a case where a solution of at least either sulfurous acid or a sulfite is used, the solution may contain a cooking penetrant (for example, a cyclic ketone compound such as an anthraquinone sulfonate, anthraquinone, or tetrahydroanthraquinone) in addition to $SO_2$ and a counter cation (salt) as needed.

There is no limitation to the equipment to be used for the sulfite treatment, and for example, generally-known production equipment or the like for dissolving pulp can be used.

In order to separate an intermediate product from a solution of at least either sulfurous acid or a sulfite, the separation can be performed in accordance with a conventional method. Example of the separation method includes a separation method of waste sulfite cooking liquor after sulfite cooking.

According to the sulfite cooking treatment, highly-sulfonated lignosulfonates may be obtained in some cases, and in those cases, slightly-sulfonated lignosulfonates can be obtained by partial desulfonation treatment. Examples of the method of desulfonation treatment include methods disclosed in U.S. Pat. No. 2,371,136 and JP 58-45287 A, but the method is not limited to those methods.

Further, slightly-sulfonated lignosulfonates can be obtained also by the method disclosed in JP 2016-135834 A, (Kraft Lignin)

Example of the lignin to be used in the present invention includes kraft lignin. The kraft lignin is also called thiolignin or sulfatelignin (sulphatelignin) as another name. As the kraft lignin, a prepared one may be used, or a commercially available product may also be used. As the organic expander for a lead storage battery, it is preferable to use kraft lignin obtained by sulfonating kraft lignin. In a preparation method, an alkaline solution of kraft lignin, powdered kraft lignin powderized by spray drying an alkaline solution of kraft lignin, or acid-precipitated kraft lignin obtained by precipitating an alkaline solution of kraft lignin with an acid can be used.

The alkaline solution of kraft lignin can be obtained by a known method such as the method disclosed in, for example, JP 2000-336589 A, but the method is not limited to such a method.

As the wood of a raw material, for example, a broad-leaved tree, a coniferous tree, a miscellaneous small tree, bamboo, kenaf, bagasse, or an empty fruit brunch obtained after palm oil extraction can be used. Specifically, examples of the broad-leaved tree include Japanese beech (*Fagus crenata*), Japanese linden (*Tilia japonica*), Japanese white birch (*Betula platyphylla*), poplar (*Populus nigra*), eucalyptus, acacia, Japanese oak (*Quercus*), painted maple (*Acer pictum*), castor aralia (*Kalopanax pictus*), elm (*Ulmus*), paulownia (*Paulownia tomentosa*), Japanese big-leaf magnolia (*Magnolia obovata*), willow (*Salix babylonica*), Sen (*Kalopanax pictus*), ubamegashi (*Quercus phillyraeoides*), konara (*Quercus serrata*), kunugi (*Quercus acutissima*), Japanese horse chestnut (*Aesculus turbinata*), Japanese zelkova (*Zelkova serrata*), Japanese cherry birch (*Betula grossa*), dogwood (*Cornus controversa*), and Chinese flowering ash (*Fraxinus lanuginosa*). Examples of the coniferous tree include Japanese cedar (*Cryptomeria japonica*), Japanese spruce (*Picea jezoensis*), Japanese larch (*Larix kaempferi*), Japanese black pine (*Pinus thunbergii*), Sakhalin fir (*Abies Sachalinensis*), Japanese white pine (*Pinus pentaphylla*), Japanese yew (*Taxus cuspidata*), Japanese arborvitae (*Thuja standishii*), tiger-tail spruce (*Picea polita*), Iramomi (*Picea alcoquiana*), yew plum pine (*Podocarpus macrophyllus*), Japanese fir (*Abies firma*), sawara cypress (*Chamaecyparis pisifera*), Japanese Douglas fir (*Pseudotsuga japonica*), hiba false arborvitae (*Thujopsis dolabrata*), cypress (*Thujopsis dolabrata*), southern Japanese hemlock (*Tsuga sieboldii*), northern Japanese hemlock (*Tsuga diversifolia*), Japanese cypress (*Chamaecyparis obtusa*), Japanese yew (*Taxus cuspidata*), Japanese plum-yew (*Cephalotaxus harringtonia*), hondo spruce (*Picea jezoensis hondoensis*), yellow cedar (*Cupressus nootkatensis*), Lawson cypress (*Chamaecyparis lawsoniana*), Douglas fir (*Pseudotsuga menziesii*), Sitka spruce (*Picea sitchensis*), radiata pine (*Pinus radiata*), eastern spruce (*Picea rubens*), eastern white pine (*Pinus strobus*), western larch (*Larix occidentalis*), western fir (*Abies*), western hemlock (*Tsuga heterophylla*), and Tamarack (*Larix laricina*).

In a case where kraft lignin is produced from wood chips, the wood chips are put into a digester together with a cooking liquor to perform the kraft cooking. Alternatively, the wood chips may be subjected to a cooking by a modified kraft process such as modified continuous cooking (MCC), extended modified continuous cooking (EMCC), isothermal cooking (ITC), Lo-solid or the like. Further, the cooking system such as a one-vessel liquor phase system, a one-vessel steam/liquor phase system, a two-vessel liquor/steam phase system, or a two-vessel liquor phase system is not particularly limited. That is, the step of impregnating wood chips with the alkaline aqueous solution of the present application and retaining the wood chips may be arranged separately from the conventional step of devices or sites, which is for the purpose of performing penetration treatment of cooking liquor. In this regard, after the cooking liquor is extracted, the unbleached cooked pulp obtained at the same time is washed with a washing device such as a diffusion washer.

A step of the kraft cooking can be performed by placing wood chips in a pressure-resistant vessel together with kraft cooking liquor, and in that case, the shape and size of the vessel are not particularly limited. The ratio of a chemical solution to the wood chips can be, for example, 1.0 to 40 L/kg, preferably 1.5 to 35 L/kg, and more preferably 2.0 to 30 L/kg.

In addition, in the present invention, an alkaline cooking liquor containing 0.01 to 10% by mass of a quinone compound per bone-dry chip may be added to the digester.

The quinone compound to be used is a quinone compound, a hydroquinone compound, or a precursor thereof as a so-called known cooking auxiliary, and at least one compound selected from them can be used. Examples of the compound include a quinone compound such as anthraquinone, dihydro anthraquinone (for example, 1,4-dihydroanthraquinone), tetrahydro anthraquinone (for example, 1,4,4a,9a-tetrahydroanthraquinone, or 1,2,3,4-tetrahydroanthraquinone), methyl anthraquinone (for example, 1-methylanthraquinone, or 2-methylanthraquinone), methyl dihydroanthraquinone (for example, 2-methyl-1,4-dihydroanthraquinone), or methyl tetrahydroanthraquinone (for example, 1-methyl-1,4,4a,9a-tetrahydroanthraquinone, or 2-methyl-1,4,4a,9a-tetrahydroanthraquinone); a hydroquinone compound such as anthrahydroquinone (in general, 9,10-dihydroxyanthracene), methyl anthrahydroquinone (for example, 2-methylanthrahydroquinone), dihydroanthrahydro anthraquinone (for example, 1,4-dihydro-9,10-dihydroxyanthracene), or an alkali metal salt thereof or the like (for example, a disodium salt of anthrahydroquinone, or a disodium salt of 1,4-dihydro-9,10-dihydroxyanthracene); and a precursor such as anthrone, anthranol, methyl anthrone, or methyl anthranol. These precursors have a possibility of being converted into quinone compounds or hydroquinone compounds under cooking conditions.

In a case where the wood chips are derived from a coniferous tree, it is preferable to set the active alkali addition ratio (AA) per bone-dry wood chip to 10 to 30% by mass in the cooking liquor. If the active alkali addition ratio is less than 10% by mass, lignin or hemicellulose are not sufficiently removed, and if the active alkali addition ratio exceeds 30% by mass, the yield is reduced and the quality is lowered. Herein, the active alkali addition ratio is calculated by converting the total addition ratio of NaOH and $Na_2S$ as the addition ratio of $Na_2O$, and the conversion to the addition ratio of $Na_2O$ can be made by multiplying the addition ratio of NaOH by 0.775 and multiplying the addition ratio of $Na_2S$ by 0.795. Further, the sulfidity is preferably in the range of 15 to 40%. In the region where the sulfurization degree is less than 20%, the delignification property is decreased, the pulp viscosity is lowered, and the residue content is increased.

It is preferable to perform the kraft cooking in the temperature range of 120 to 180° C., and more preferable to perform the kraft cooking in the temperature range of 140 to 160° C. If the temperature is extremely low, the delignification (decrease in kappa number) is insufficient, but on the other hand, if the temperature is extremely high, the polymerization degree (viscosity) of cellulose is decreased. Further, the cooking time in the present invention refers to the time from when the cooking temperature reaches the highest temperature to when the temperature starts to decrease, and the cooking time is preferably 60 minutes or more and 600 minutes or less, and more preferably 120 minutes or more and 360 minutes or less. If the cooking time is less than 60 minutes, the pulping does not proceed, but if the cooking time exceeds 600 minutes, the pulp production efficiency is deteriorated, and therefore, these cases are not preferred.

In addition, in the kraft cooking in the present invention, the treatment temperature and treatment time can be set by using an H factor (Hf) as an index. The H factor is an indication of the total amount of the heat given to a reaction system during cooking process, and is expressed by the following formula. The H factor is calculated by integrating the time from when chips are mixed with water to when the cooking is completed. The H factor is preferably 250 to 6000.

$$Hf = \int \exp(43.20 - 16113/T) dt$$

As the acid-precipitated kraft lignin in which an alkaline solution of kraft lignin is precipitated with an acid, an acid-precipitated kraft lignin in a powdered state, which is obtained by a method disclosed in WO 2006/038863, WO 2006/031175, WO 2012/005677 or the like, can be used, but the method is not limited to such a method.

A sulfomethylated kraft lignin sulfomethylated by using a method disclosed in, for example, "Studies on Utilization of Lignin. III. Sulfomethylation of Thiolignin: Osamu Oita, Junzo Nakano, Nobuhiko Migita, Journal of Wood Science, Vol. 12, No. 5, pp. 239 to 244 (1966)" as the method for obtaining a sulfonated lignin in which the above kraft lignin is sulfonated, and a sulfonated lignin disclosed in U.S. Pat. No. 5,049,661 can be mentioned, as the sulfonated lignin.

As the sulfonated lignin, a prepared one may be used, or a commercially available product may also be used. Examples of the commercially available product include POLYFON, and REAR (both manufactured by Ingevity Corporation).

The sulfomethylated lignin may be produced by a known method, and can be produced by reacting, for example, lignin with a sulfite and aldehydes.

An example of a method for sulfomethylating lignin is disclosed in U.S. Pat. No. 2,680,113. In this method, the sulfonated methylation treatment of lignin is performed in the temperature range of 50 to 200° C., preferably in the temperature range of 80 to 170° C., and more preferably in the temperature range of 100 to 160° C. The amount of the sulfite to be added is preferably 1 to 50% with respect to the lignin. Formaldehyde is preferable as the aldehydes, and the amount of the aldehyde to be added is preferably 0.25 to 12.5% with respect to the lignin. If the formaldehyde is not in the above range, a sulfone group is not introduced into the lignin. Further, the pH is preferably 8 or more.

In the sulfomethylated lignin to be used in the present invention, it is preferable that an S content of a sulfonic acid (salt) group represented by —$SO_3M$ (M represents a hydrogen atom, a monovalent metal salt, or a divalent metal salt in the general formula (1)) is 1.0 to 4.0% by mass.

The S content of a group represented by —$SO_3M$ (M represents a hydrogen atom, a monovalent metal salt, or a divalent metal salt in the general formula (1)) refers to the content of the sulfur atoms contained in —$SO_3M$ (M represents a hydrogen atom, a monovalent metal salt, or a divalent metal salt in the general formula (1)) with respect to the solid content of lignin. Specifically, the S content is a value calculated from the following mathematical formula (1).

S content (% by mass) of sulfonic acid (salt) group=the total S content (% by mass)−inorganic S content (% by mass)    Mathematical formula (1):

(in the mathematical formula (1), the S content indicates the S content relative to the solid content of the lignin in any case.)

In the mathematical formula (1), the total S content is all of the S contents contained in lignin, and can be quantified by ICP emission spectroscopy. Further, the inorganic S content can be calculated as the total amount of the $SO_3$ content, $S_2O_3$ content, and $SO_4$ content quantified by ion chromatography.

In the sulfomethylation reaction of kraft lignin, in general, a sulfone group is introduced into a $C_6$-$C_3$ unit of lignin at a position of the general formula (1) shown below. The general formula (1) represents a $C_6$-$C_3$ unit that is a partial structure of lignin. That is, the reaction indicated by the arrow on the left side is a reaction in which a sulfone group is introduced at the α-position, and is generally called sulfonation. In the reaction indicated by the arrow on the right side, a sulfone group is introduced at the 4-position of an aromatic nucleus in addition to the α-position via formaldehyde.

{Chem. 1}

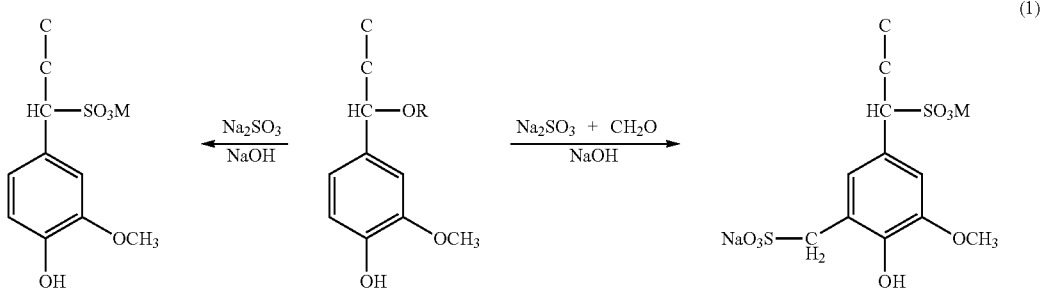

(1)

(Methoxy Group)

In the sulfomethylated lignin to be used in the present invention, the methoxy group content per solid content is 3% by mass or more, preferably 5% by mass or more, and more preferably 7.0% by mass or more. The upper limit is 20% by mass or less, preferably 19.5% by mass or less, and more preferably 19.2% by mass or less. In general, a methoxy group attached to an aromatic nucleus is present in the structure of lignin. Therefore, the methoxy group content is an index of the lignin content.

In the present invention, the methoxy group content is a value as measured by a quantitative method of methoxy groups with the Viebock and Schwappach procedure (see, pp. 336 to 341 of "Methods in lignin chemistry" published by Uni Publishing Co., Ltd. in 1994).

The methoxy group, the S content of a sulfone group, the reducing sugars, and the content of an inorganic salt of a sulfonated compound of kraft lignin are as described in the above item of lignosulfonates.

(Organic Acid (Salt))

The organic expander according to the present invention contains an organic acid (salt). As the organic acid, at least one organic acid (salt) selected from, for example, acetic acid, glycolic acid, malonic acid, malic acid, maleic acid, ascorbic acid, succinic acid, glutaric acid, fumaric acid, citric acid, tartaric acid, lactic acid, xylonic acid (salt), galactonic acid (salt), arabinonic acid (salt), meta-saccharinic acid (salt), iso-saccharinic acid (salt), and glycolic acid (salt) is contained in an amount of 0.0001 to 5% by mass per solid content of the organic expander. It is preferable to contain at least one organic acid (salt) selected from xylonic acid (salt), galactonic acid (salt), arabinonic acid (salt), meta-saccharinic acid (salt), iso-saccharinic acid (salt), and glycolic acid (salt). Examples of the salt include salts in various forms, such as a sodium salt, a calcium salt, and a magnesium salt. Preferably, the salt is a sodium salt.

The organic expander according to the present invention is required to contain an organic acid (salt) in an amount of 0.0001 to 5% by mass per solid content of the organic expander. In a case where the content of the organic acid is in the above range, the various performances of a lead storage battery are improved although the reason is unknown.

The organic acid may be in the form of a salt. Examples of the form of a salt include forms of a sodium salt, a calcium salt, a magnesium salt, and an ammonium salt. One kind of salts may be used, or two or more kinds of salts may be used in combination.

The organic expander according to the present invention is mainly added to a negative electrode plate of a lead storage battery. The addition ratio of the solid content of the organic expander is usually 0.02 to 1.0% by mass with respect to lead powder.

The above organic acid may be mixed with lignin in advance and used, or may be mixed with lead powder separately from the lignin and used. The organic acid content can be measured by ion chromatography.

The lead storage battery using the organic expander for a lead storage battery according to the present invention can be used as a battery for an automobile, a battery for a portable device, a backup battery for a computer, a battery for communication, or the like.

EXAMPLES

Hereinafter, the present invention will be described in more detail by way of Examples. The following Examples are for suitably illustrating the present invention only, and do not limit the present invention.

The Production Examples of lignin used in Examples are described below.

Production Example 1

After adjusting the pH of San X 252 (manufactured by NIPPON PAPER INDUSTRIES CO., LTD., concentration: 43%, and main component: lignin sodium sulfonate) with 40% NaOH to pH 12, alkaline air oxidation was performed at 140° C. for 30 minutes, and then 70% sulfuric acid was added to adjust the pH to 3, and partially-desulfonated lignosulfonates were fractionally precipitated to obtain lignin (Lig 1) containing lignosulfonates. (S content of sulfonic acid (salt) group: 3.3% by mass, and methoxy group content: 11.5%)

Production Example 2

In accordance with the method disclosed in Examples of WO 2012/005677, precipitated kraft lignin was obtained from kraft cooking black liquor of a coniferous tree. The obtained precipitated kraft lignin was dissolved in 48% NaOH to obtain a kraft lignin solution (Lig 2) having a pH of 10 and a solid content concentration of 20%.

Production Example 3

A kraft lignin solution (Lig 3) having a pH of 10 and a solid content concentration of 20% was obtained in a similar manner as in Production Example 2 except that the kraft cooking black liquor of a coniferous tree was changed to kraft cooking black liquor of a broad-leaved tree.

Production Example 4

Into a stainless steel reaction vessel equipped with a thermometer, a stirring device, and a reflux device, 100 parts of Lig 2, 400 parts of water, 7.0 parts of 37% formaldehyde solution (manufactured by Wako Pure Chemical Industries, Ltd.), and 10 parts of sodium sulfite (manufactured by Wako Pure Chemical Industries, Ltd.) were charged, and the temperature was raised to 140° C. under stirring. After raising the temperature, the reaction was performed for 2 hours while maintaining the temperature at 140° C. After that, the resulting preparation was cooled to obtain a sulfomethylated kraft lignin solution having a pH of 10 and a solid content concentration of 20%, and then powdered lignin (Lig 4) was obtained by spray drying. (S content of sulfonic acid (salt) group: 2.4% by mass, and methoxy group content: 11.0%)

Production Example 5

A sulfomethylated kraft lignin solution having a pH of 10 and a solid content concentration of 20% was obtained in a similar manner as in Production Example 4 except that the Lig 2 was changed to Lig 3, and then powdered lignin (Lig 5) was obtained by spray drying. (S content of sulfonic acid (salt) group: 1.4% by mass, and methoxy group content: 17.9%)

Example 1

(Production of Organic Expander)
The organic expander of Example 1 was obtained by mixing sodium xylonate with the lignin (Lig 1) containing lignosulfonates obtained in Production Example 1 so that the sodium xylonate in an amount of 0.002% by mass per solid content was contained with respect to the lignin (Lig 1) in the organic expander.
(Production of Positive Electrode Plate)
Lead powder containing 70 to 80% by weight of lead monoxide, 13% by mass dilute sulfuric acid with respect to the lead powder (specific gravity: 1.26 at 20° C.), and 12% by mass water with respect to the lead powder were kneaded to prepare positive electrode active material paste. Around 25 g of the above paste-formed positive active material was filled into a collector formed of a lattice body made of a lead alloy, and then was left (aged) undried at 80° C. for 24 hours in a nitrogen atmosphere to obtain an unformed positive electrode plate.

(Production of Negative Electrode Plate)
Next, lead powder containing 70 to 80% by weight of lead monoxide, 13% by mass dilute sulfuric acid with respect to the lead powder (specific gravity: 1.26 at 20° C.), 12% by mass water with respect to the lead powder, 1.2% by mass barium sulfate, and the organic expander of Example 1 in an amount of 0.3% by mass in terms of a solid content were kneaded to prepare negative electrode active material paste. Around 25 g of the negative electrode active material paste was filled into a collector formed of a lattice body made of a lead alloy, and then was left (aged) undried at 80° C. for 24 hours in a nitrogen atmosphere to obtain an unformed negative electrode plate.
(Preparation of Lead Storage Battery)
A lead storage battery having a rated capacity of 28 Ah at 2 V was prepared by combining the negative electrode plate and positive electrode plate obtained by the production methods described above.

Example 2

The organic expander of Example 2 was obtained by mixing sodium meta-saccharinate with the lignin (Lig 4) obtained in Production Example 4 so that the sodium meta-saccharinate in an amount of 0.30% by mass per solid content was contained with respect to the lignin (Lig 4) in the organic expander. A positive electrode plate, a negative electrode plate, and a lead storage battery were prepared in a similar manner as in Example 1 except that the organic expander obtained in Example 2 was used.

Example 3

The organic expander of Example 3 was obtained by mixing sodium meta-saccharinate with the lignin (Lig 5) obtained in Production Example 5 so that the sodium meta-saccharinate in an amount of 1.0% by mass per solid content was contained with respect to the lignin (Lig 5) in the organic expander. A positive electrode plate, a negative electrode plate, and a lead storage battery were prepared in a similar manner as in Example 1 except that the organic expander obtained in Example 3 was used.

Comparative Example 1

A positive electrode plate, a negative electrode plate, and a lead storage battery were prepared in a similar manner as in Example 1 except that the lignin (Lig 1) containing lignosulfonates obtained in Production Example 1 was used as it was without adding any organic acid as the organic expander.

Comparative Example 2

A positive electrode plate, a negative electrode plate, and a lead storage battery were prepared in a similar manner as in Example 1 except that the lignin (Lig 4) obtained in Production Example 4 was used as it was without adding any organic acid as the organic expander.

Comparative Example 3

A positive electrode plate, a negative electrode plate, and a lead storage battery were prepared in a similar manner as in Example 1 except that the lignin (Lig 5) obtained in Production Example 5 was used as it was without adding any organic acid as the organic expander.
The following respective tests were performed on the lead storage batteries produced in Examples and Comparative Examples.

(5-Hour Rate Capacity Test)

A 5-hour rate capacity test was performed in accordance with JIS D5301. The discharge duration time was evaluated. The longer the discharge duration time is, the better the evaluation is.

(High-Rate Discharge Characteristic Test)

A high-rate discharge characteristic test at 150 A was performed in accordance with JIS D5301. The discharge duration time was evaluated. The longer the discharge duration time is, the better the evaluation is.

(Charge Acceptance Test)

A charge acceptance test was performed in accordance with JIS D5301. The charging current in 10 minutes after the start of charging was evaluated. The higher the current value is, the better the evaluation is.

The test results are shown in Table 1.

TABLE 1

| | Lignin | Organic acid Kind | Content | 5-Hour rate capacity test | High-rate discharge characteristic test | Charge acceptance test |
|---|---|---|---|---|---|---|
| Example 1 | Lig 1 | Sodium xylonate | 0.002% | 5.5 h | 3.8 min | 12.5 A |
| Example 2 | Lig 4 | Sodium meta-saccharinate | 0.30% | 5.2 h | 3.5 min | 12.0 A |
| Example 3 | Lig 5 | Sodium meta-saccharinate | 1.00% | 5.0 h | 3.4 min | 12.0 A |
| Comparative Example 1 | Lig 1 | — | — | 4.8 h | 2.8 min | 9.0 A |
| Comparative Example 2 | Lig 4 | — | — | 4.5 h | 2.9 min | 9.5 A |
| Comparative Example 3 | Lig 5 | — | — | 4.6 h | 2.6 min | 8.0 A |

As shown in Table 1, it can be understood that the lead storage batteries in Examples of the present invention, which use an organic expander containing an organic acid in an amount of 0.0001 to 5% by mass per solid content exhibit excellent capacity characteristics, high-rate discharge characteristics, and charge acceptance, as compared with the lead storage batteries of Comparative Examples using an organic expander without containing any organic acid.

The invention claimed is:

1. An organic expander for a lead storage battery containing lignin having a methoxy group content of 3 to 20% by mass per solid content, the organic expander comprising an organic acid in an amount of 0.0001 to 5% by mass per solid content of the organic expander, wherein the organic acid is at least one organic acid (salt) selected from xylonic acid (salt), galactonic acid (salt), arabinonic acid (salt), meta-saccharinic acid (salt), isosaccharinic acid (salt), and glycolic acid (salt).

2. The organic expander for a lead storage battery according to claim 1, wherein, in the lignin, an S content of a sulfonic acid group (S content of a group represented by the general formula (1): —$SO_3M$ (where M represents a hydrogen atom, a monovalent metal salt, or a divalent metal salt)) is 1.0 to 4.0% by mass per solid content.

3. A lead storage battery, comprising an electrode plate, wherein the organic expander according to claim 1 is added to the electrode plate.

* * * * *